United States Patent [19]
Duffy

[11] Patent Number: 4,561,521
[45] Date of Patent: Dec. 31, 1985

[54] VARIABLE ASSIST POWER STEERING SYSTEM

[75] Inventor: James J. Duffy, Livonia, Mich.

[73] Assignee: Ford Motor Company, Dearborn, Mich.

[21] Appl. No.: 678,844

[22] Filed: Dec. 6, 1984

[51] Int. Cl.⁴ ............................................. B62D 5/08
[52] U.S. Cl. ..................... 180/142; 60/468; 91/375 A; 91/437; 137/596.12
[58] Field of Search .................. 180/142, 143, 141; 60/467, 468; 91/434, 437, 450, 375 A; 137/596.12

[56] References Cited

U.S. PATENT DOCUMENTS

| | | | |
|---|---|---|---|
| 4,063,490 | 12/1977 | Duffy | 91/467 |
| 4,186,818 | 2/1980 | Jablonsky | 180/133 |
| 4,189,024 | 2/1980 | Jablonsky | 180/133 |
| 4,434,866 | 3/1984 | Duffy | 180/143 |

Primary Examiner—John A. Pekar
Attorney, Agent, or Firm—Donald J. Harrington; Keith L. Zerschling

[57] ABSTRACT

A power steering gear mechanism for an automotive vehicle having a pressure operated vehicle steering mechanism controlled by a rotary valve with primary and secondary valve portions wherein the primary valve portion develops a fast-rising steering pressure characteristic for incremental changes in steering torque at low driving speeds and a flatter or more gradual steering pressure rise characteristic for incremental changes in steering torque at high driving speeds, the latter resulting from the action of the secondary valve portion which functions in cooperation with the primary valve portion whereby the pressure versus torque relationship is optimized for parking maneuvers, for driving maneuvers and for center-feel, the change from the low speed steering mode to the high speed steering mode being gradual whereby the center-feel increases in proportion to increasing road speed.

17 Claims, 10 Drawing Figures

VARIABLE ASSIST POWER STEERING SYSTEM

GENERAL DESCRIPTION OF THE INVENTION

This invention comprises improvements in the power steering system disclosed in my co-pending application, Ser. No. 430,223, filed Sept. 30, 1982, now abandoned, which is assigned to the assignee of this invention. The steering gear mechanism shown in my co-pending application includes a rack-and-pinion power steering mechanism for a wheeled vehicle. A power steering positive displacement pump is used in the steering system to supply working pressure to the fluid motor thus actuating the piston that drives the rack for the steering gear mechanism. The power steering pump is engine driven. It is provided in known fashion with a constant flow control valve that permits a constant flow of fluid to the steering system regardless of pump speed.

The control valve for controlling distribution of pressure to the fluid motor for the steering system is a rotary valve comprising a valve sleeve connected to and movable with the pinion for the rack and pinion steering gear assembly. An inner valve member received in the valve sleeve is provided with external valve lands that register with internal valve lands formed in the sleeve. The inner valve member is connected to the torque input shaft, which is under the control of the vehicle operator. The torque input shaft is connected also to the driving pinion for the rack-and-pinion assembly through a yieldable connection. In the embodiment described in my co-pending application, the connection is a torsion bar that is capable of deflecting to permit relative angular movement of the inner valve member with respect to the sleeve as steering torque is applied to the torque input shaft.

The valve structure is divided into two portions identified as a primary portion and a secondary portion. Each portion has its independent valve lands. Fluid is supplied from the pump to the primary portion, and the primary portion distributes pressure to one side of the fluid motor or the other depending upon the direction of the torque applied to the torque input shaft. A speed sensitive valve is used to control fluid flow from the outlet side of the pump to the secondary valve portion so that at high vehicle speeds a parallel flow path is provided between the steering valve and the pump as fluid is distributed to both steering valve portions.

At low vehicle speeds, the speed sensitive valve restricts the flow of fluid from the pump to the secondary valve section. During parking maneuvers, the primary valve section acts alone in the normal manner and the secondary valve portion is vented and not fed with fluid from the power steering pump. In preferred working embodiments, the primary valve closes at about 2.5 degrees of relative valve motion of the inner valve with respect to the valve sleeve, and the torsion bar torque then is low. Above a predetermined speed the solenoid valve opens thereby allowing fluid to be distributed from the pump to the secondary valve portion in parallel with respect to the flow to the primary valve portion. The secondary valve portion closes at about 5 degrees, providing a high torsion bar torque.

According to a feature of my present invention, a change from a high degree of power assist to a low degree of power assist, and conversely, is effected by a variable force solenoid or an electric actuator motor which is used to establish a parallel flow path from the pump to the secondary valve sections through a variable flow orifice. A speed sensing module controls the solenoid or actuator motor to open and close a variable orifice valve thus providing gradual changes in the degree of power assist as the vehicle speed changes.

BRIEF DESCRIPTION OF THE FIGURES OF THE DRAWINGS

FIG. 6 combines the information that would be viewed from the plane of section line III—III with the information that would be viewed from the plane of section line VI—VI.

PARTICULAR DESCRIPTION OF THE INVENTION

Figure 1:
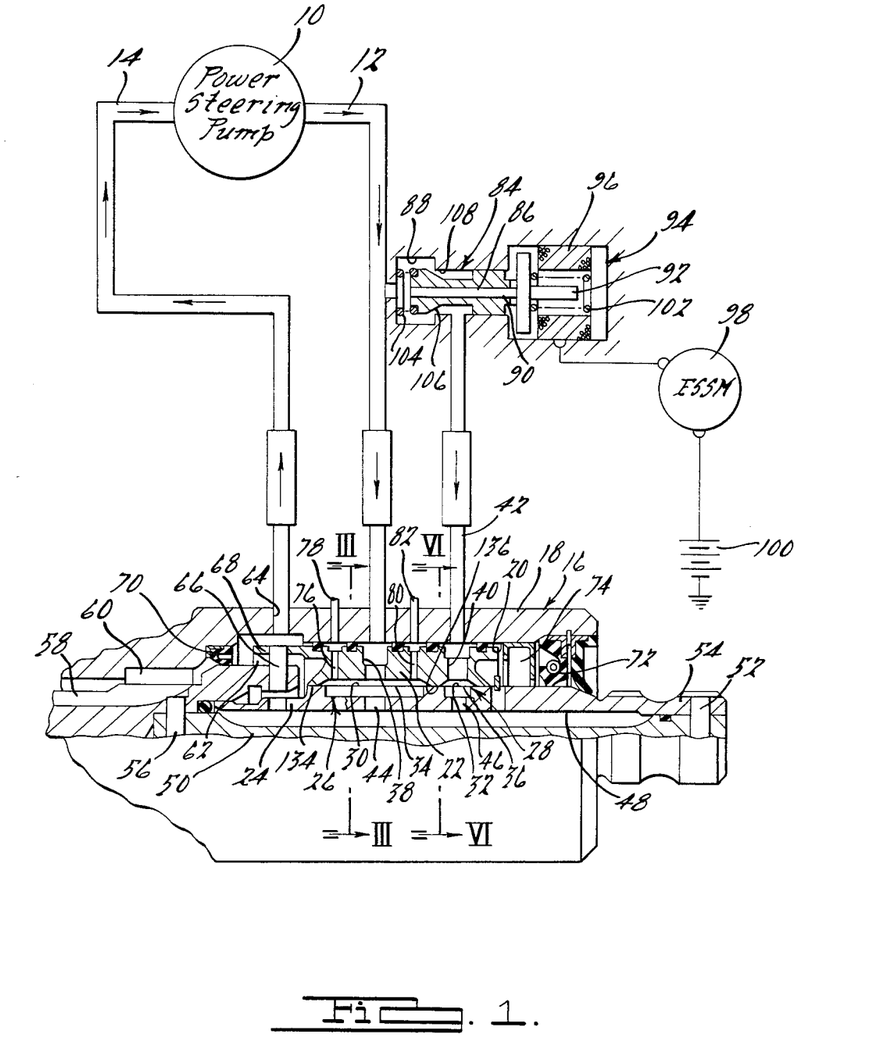
FIG. 1 shows in schematic form a first embodiment of my invention including a dual rotary valve for a power steering gear together with a variable speed sensitive flow control orifice valve for controlling fluid flow from a power steering pump to each of two rotary valve portions.

In FIG. 1 numeral 10 designates a power steering pump for a vehicle power steering system having a vehicle engine and dirigible vehicle wheels. The pump 10 is adapted to be driven by the vehicle engine. It includes a flow control valve of well-known design for maintaining a constant flow in an flow output passage 12 regardless of vehicle speed. The flow return passage for the pump 10 is shown at 14.

A steering gear valve is shown generally at 16. It includes a valve housing 18 having a circular opening 20 which receives a valve sleeve 22. Positioned in the valve sleeve 22 is an inner valve 24. Valve 24 is provided with a primary valve section 26 and a secondary valve section 28. Valve section 26 includes valve lands 30 and valve section 28 includes valve lands 32. These lands 30 and 32 register with internal valve lands 34 and 36, respectively, formed in sleeve 22.

The sleeve 22 is ported at 38 to communicate with power steering pump supply passage 12. It is ported also at 40 to communicate with a secondary flow delivery passage 42. A radial port 44 communicates with the registering primary valve lands 30 and 34 and a radial port 46 communicates with the secondary registering valve lands 32 and 36. Ports 44 and 46 are formed in the inner valve member 24.

The valve element 24 has a central opening 48 which receives torsion bar 50, the right hand end of which is pinned at 52 to an externally splined torque input shaft 54, the latter being connected to a driver controlled steering shaft. The left hand end of the torsion bar 50 is pinned at 56 to a pinion 58 which is adapted to engage a steering gear rack that in turn is connected to the steering gear linkages for the dirigible wheels of the vehicle. Pinion 58 is journalled by bushing 60 in the valve housing 18.

The central opening 48 communicates with space 62 which in turn communicates with flow return passage 14 through port 64 formed in the valve housing 18. The valve sleeve 22 is connected to pinion 58 by means of a pin and slot connection defined by pin 66 received in slot 68 formed in the end of the sleeve 22. Sleeve 22 thereby rotates with the pinion 58. A fluid seal 70 isolates the pinion 58 and bushing 60 from the space 62. Fluid seal 72 located at the opposite end of the inner valve member 24 seals the right hand end of the opening 20. Valve member 24 is journalled in valve housing 18 at its right hand end by bearing 74. A left turn port 76 in the valve sleeve 22 communicates with a left turn passage 78 that extends to one side of a fluid motor for the steering gear linkage. A right turn port 80 communicates with a right turn passage 82 which communicates with the other end of the fluid motor.

A variable orifice valve 84 comprises a valve element 86 slidably positioned in the valve chamber 88 formed in a valve body. Valve element 86 includes a valve stem 90 adapted to be engaged by a solenoid armature 92. The armature 92 forms a part of a variable force solenoid 94 that has solenoid windings 96 that can be energized by an electronic speed sensing module 98 powered by the vehicle battery 100. The solenoid includes a spring 102 that normally urges the valve element 86 into the position shown in FIG. 1, which is the opened position. Spring 102 overcomes the force of spring 104 acting in the opposite direction on the valve element 86.

Valve element 86 includes a tapered section 106 that registers with orifice 108 to provide a variable flow area for the fluid in passage 12. That area establishes a parallel flow path from the outlet side of the pump to the secondary feed passage 42.

The valve system of FIG. 1 provides a high degree of assist for parking and reduced assist for driving at high speeds. During a parking maneuver the primary valve portion acts alone in the normal manner and the secondary valve is vented and not fed with fluid from the pump 10. The primary valve portion closes at about $2\frac{1}{2}°$ of valve travel for the inner valve with respect to the sleeve. Torsion bar torque is relatively low for such deflection. Above a predetermined speed the solenoid valve opens thereby providing a parallel flow delivery path through the passage 42. This effects an increased feel. The secondary valve portion closes it flow port area upon relative deflection of about 5°. The torsion bar torque at that time is high.

A gradual increase in the degree of power assist is effected because orifice valve 84 progressively changes the flow area for passage 42 from a fully closed position to a fully opened position. The degree of restriction is dependent upon the speed signal received from the electronic vehicle speed sensing module 98. The lands 30 of the internal valve 24 are formed by four flats 108 which are machined by a transverse broaching operation. The flats 108 are broached transversely with respect to the axis of torsion bar 50 to develop a generally square primary valve section. The internal valve lands 34 in the valve sleeve 22 register with the valve lands 30. A separate land 30 registers with each internal valve land. One internal valve land is formed by an axially extending groove in the sleeve which communicates with right turn passage 80. Another internal valve land is formed by an axially extending groove that communicates with left turn passage 78.

Figure 3:
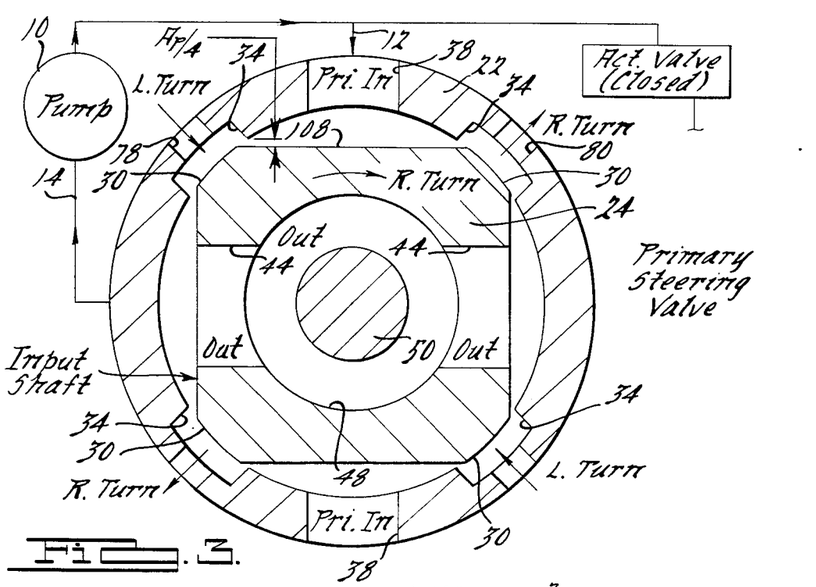
FIG. 3 is a cross-sectional view of the dual rotary valve structure as seen from the plane of section line III—III of FIG. 1.

The flow area for primary valve lands 30 and 34 is represented in FIG. 3 by the symbol $A_p$. Since there are four valve lands in the sleeve, the total flow area for each land equals $A_p$ divided by 4. The flow inlet ports for the primary valve are located 180° out of position, one with respect to the other. They both have been identified by common reference character 38. Each port 38 communicates with delivery passage 12 seen in FIG. 1.

There are two flow return passages 44 in the inner valve member 24. These are adapted to receive the return flow from the registering valve lands 30 and 34 at each of the four locations. Passages 44 communicate with inner passage 48 which in turn communicates with the return passage 14 as explained previously.

Figures 4, 5:
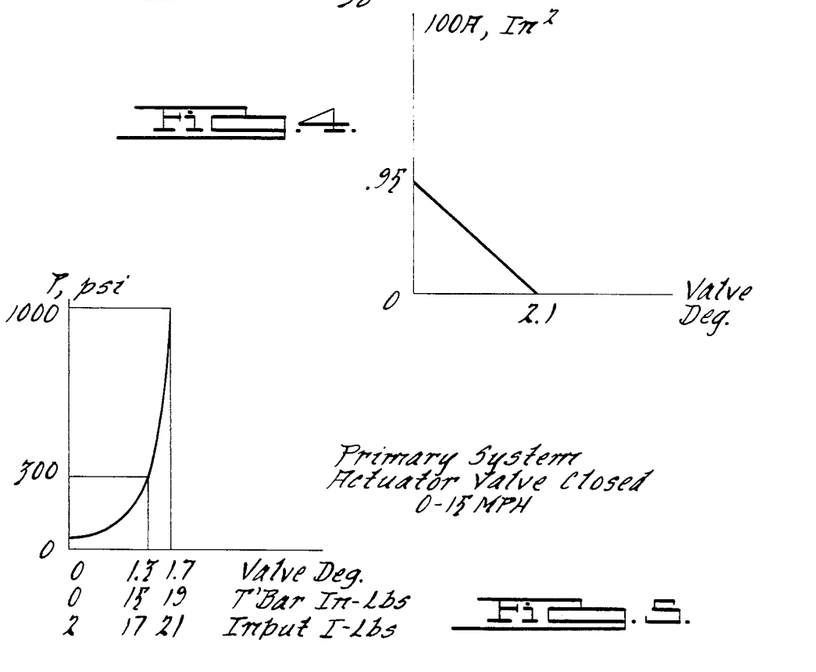
FIG. 4 is a chart that shows the relationship between the valve travel and the flow area for the power steering valve.
FIG. 5 is a chart that shows the relationship between torsion bar torque or valve degree travel and the pressure made available to the fluid motor.

When torque is applied to torsion bar 50, relative displacement of inner valve member 24 relative to sleeve 22 takes place. This decreases the total area $A_p$ in accordance with the relationship shown in FIG. 4. At 2.1° of relative valve displacement, lands 30 and 34 completely block the flow area. The flow area has a maximum of about $0.95 \times 10^{-2}$ square inches when torque on the torsion bar is zero. The variation in pressure results from the changes in area, as shown in FIG. 5. When the steering effort is 21 inch pounds and the resulting relative displacement of the valve parts is 1.70°, the steering pressure is a maximum which may be about 1000 psi. In straight-ahead driving when the torsion bar torque is zero, the pressure is 50 psi. This assumes that the pump flow is maintained at a constant value of 2.4 gallons per minute.

Figure 6:
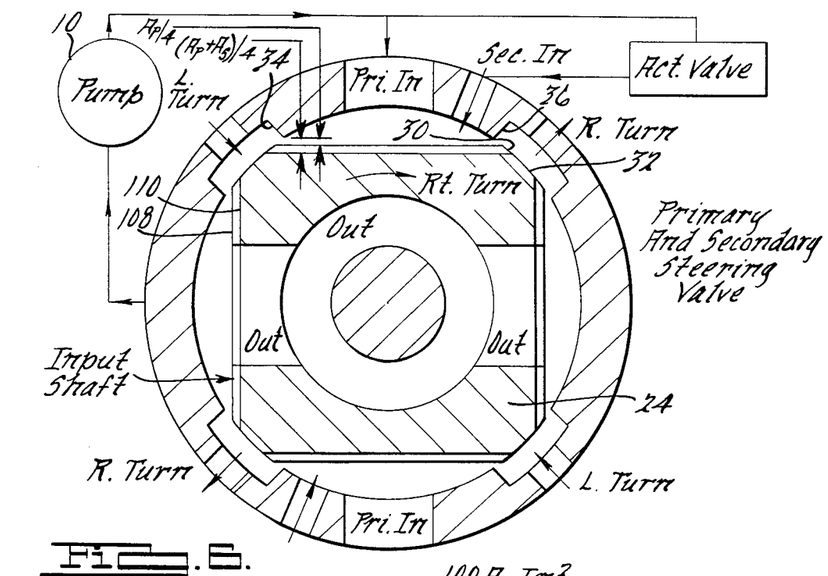
FIG. 6 is a schematic cross-sectional view as seen from the planes of section lines III—III and VI—VI of FIG. 1 showing the relationship between the valve lands of the sleeve and the valve lands of the inner valve member at both the primary and secondary valve portions. For purposes of simplicity, the geometry of the valve lands has been combined in a single view in FIG. 6 although in reality the actual plane of FIG. 6 is out of the plane of section lines III—III and VI—VI of FIG. 1.
Figures 7, 8:
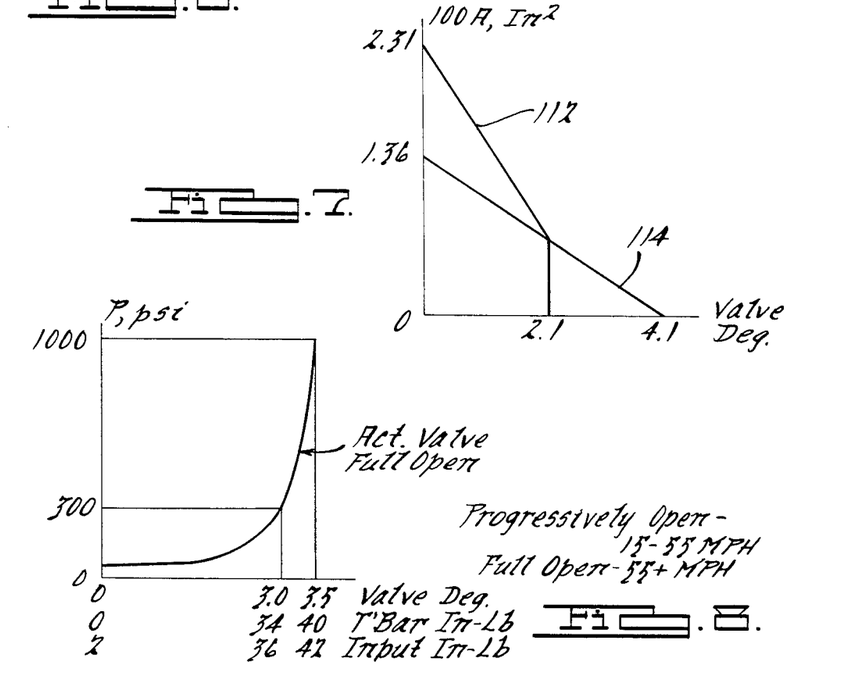
FIG. 7 is a chart that shows the relationship between valve travel and total area for the valve seen in FIG. 6.
FIG. 8 is a chart that shows the relationship between torsion bar travel and pressure made available to the fluid motor for the steering gear that includes the valve schematically shown in FIG. 6.

In FIG. 6 I have shown in a combined cross-sectional view the geometry of the primary valve section and the secondary valve section. The secondary valve lands 32 on the inner valve 24 are formed by machining transverse flats 110. There are four such flats 110. They define a generally square valve cross section. The lands 32 are slightly shorter than the lands 30 and thus the flow area defined by the registering internal lands 36 and the external lands 32 is not closed off until the torsion bar torque reaches a value that is higher than the torque that exists when the flow area defined by the lands 30 and 36 is closed off. As explained previously, the primary valve lands close off the flow area when the relative displacement of the inner valve member relative to the sleeve equals 2.1°. This is seen by referring to FIG. 7. The secondary valve lands do not close until the valve displacement reaches 4.1°. The flow area for the primary valve lands and the secondary valve lands is represented in the curve of FIG. 7 by the line 112. The flow area of the secondary valve lands after the primary valve lands close the primary valve flow area is represented by the straight line 114 in FIG. 7.

The relationship between the flow and the valve land areas illustrated in FIG. 7 develops a pressure torque relationship as indicated in FIG. 8. The transition from the primary valve operating mode to the operating mode where both primary and secondary valves function is a progressive change depending upon the vehicle speed and the degree of fluid bypass from the power steering pump to the secondary valve feed passage 42 through the variable orifice valve 84. In a preferred embodiment the orifice valve progressively opens between the road speeds of 15 miles per hour to 55 miles per hour. The orifice valve is fully opened at speeds in excess of 55 miles per hour.

Figure 2:
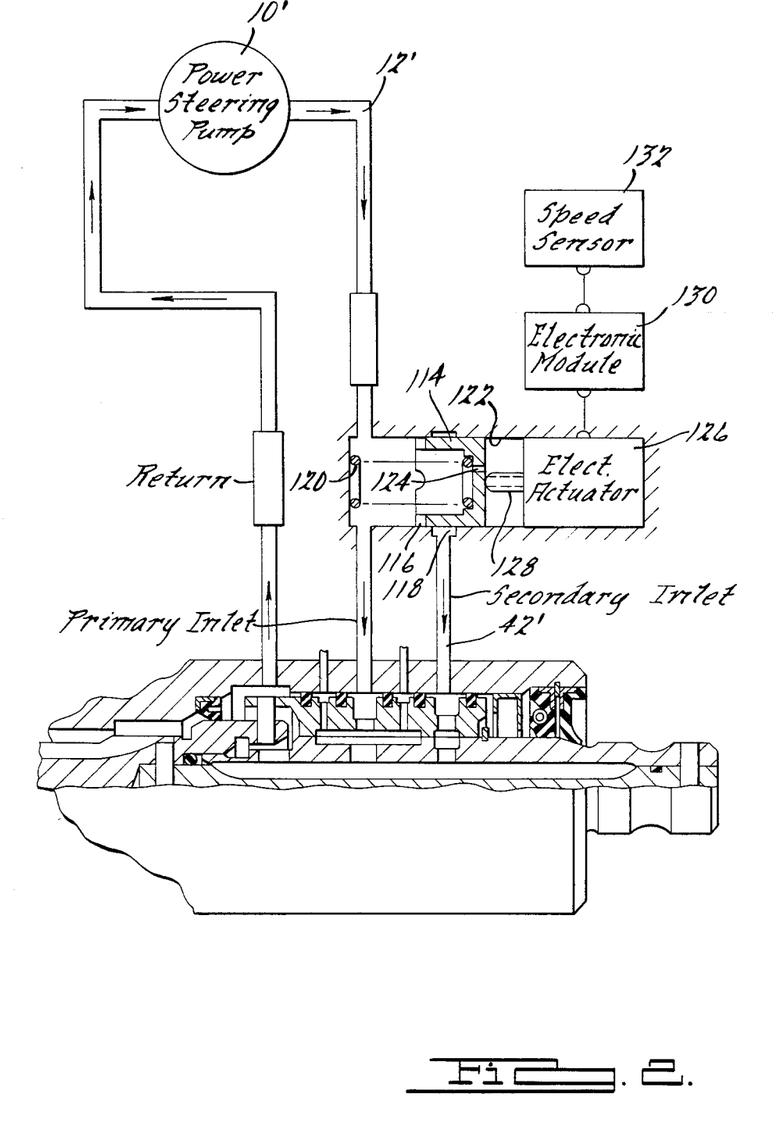
FIG. 2 is an alternate embodiment of invention wherein a variable orifice valve is adapted to be triggered by an electric actuator motor under the control of a vehicle speed sensitive electronic module. The valve varies the flow distributed by the pump to the secondary rotary valve portion.

In FIG. 2 I have shown an alternate form of a variable orifice valve rather than the tapered valve spool shown in FIG. 1. I have shown in FIG. 2 a valve element 114 of constant diameter. It has at one side thereof a variable orifice 116 which is adapted to register with port 118 located in secondary valve feed passage 42' which corresponds to passage 42 in the FIG. 1 embodiment. Valve element 114 is urged in a left hand direction by valve spring 120. Valve element 114 is slidably situated in valve bore 122. It includes a pressure balancing orifice 124 to equalize the pressure on either side of the valve element 114.

The valve chamber on the left hand side of the valve element 114 communicates with passage 12' which corresponds to passage 12 in the FIG. 1 embodiment.

An electrical actuator motor 126 operates a worm screw 128 which engages valve element 114. When the electrical actuator motor 126 is energized, the screw 128 moves the valve element 114 in a left hand direction thereby restricting the degree of communication between orifice 116 and the port 118. Movement in the opposite direction occurs upon an increase in speed of the vehicle until full communication is established between passage 12' on the outlet side of the pump 10' and the port 118. Electrical actuator motor 126 is under the control of an electronic module 130 which in turn is responsive to the signal received from a vehicle speed sensor 132.

In the embodiments of FIGS. 1 and 2 a seal is provided at 134. At the left hand end of the primary valve lands as the internal diameter of the sleeve registers in sealing relationship with the external diameter of the inner valve member. On the right hand side of the primary valve land is a fluid seal dam 136 which seals the primary lands from the secondary lands. Again this is accomplished by effecting a sealing relationship between the inside diameter of the sleeve with respect to the outside diameter of the inner valve member at a location intermediate the primary lands and the secondary lands.

Using this improved steering system an increase in the vehicle speed will result in a gradual decrease in the degree of power assist thereby providing increased road feel and stability. The secondary valve lands have a wider metering valve opening than the primary valve side. The secondary valve flow area closes at a higher angular deflection of the torsion bar than the deflection that exists when the primary valve land areas close.

When the vehicle speed increases to a calibrated value such as 55 miles per hour, the actuator valve is fully opened. Thus at that point, the primary and secondary sections are no longer hydraulically separated, one with respect to the other. The rotary valve then functions in a normal manner such as the manner described in my co-pending application. In the mid-speed range the steering efforts increase gradually with an increasing vehicle speed as the orifice valve responds to the speed sensitive actuator.

Figure 9:
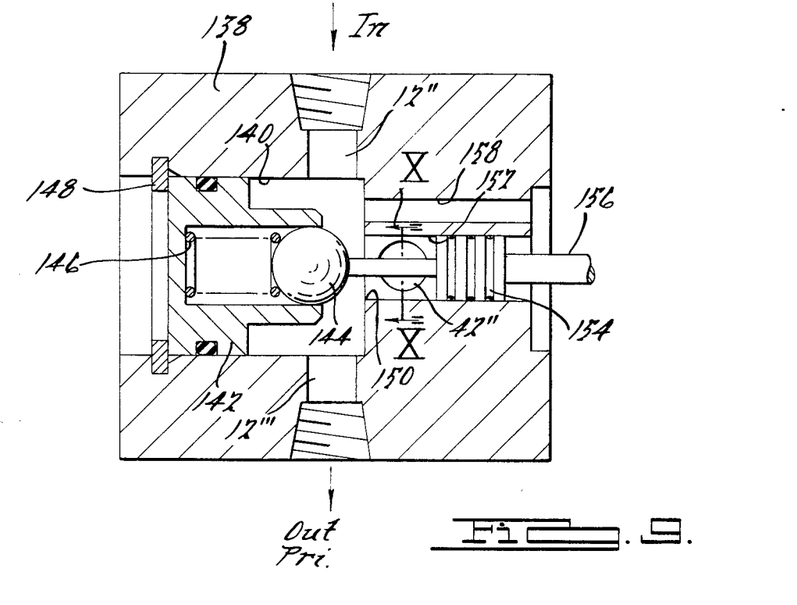
FIG. 9 is a schematic cross-sectional view of an alternate form of orifice control valve for use in a system of the kind shown in FIG. 1.
Figure 10:
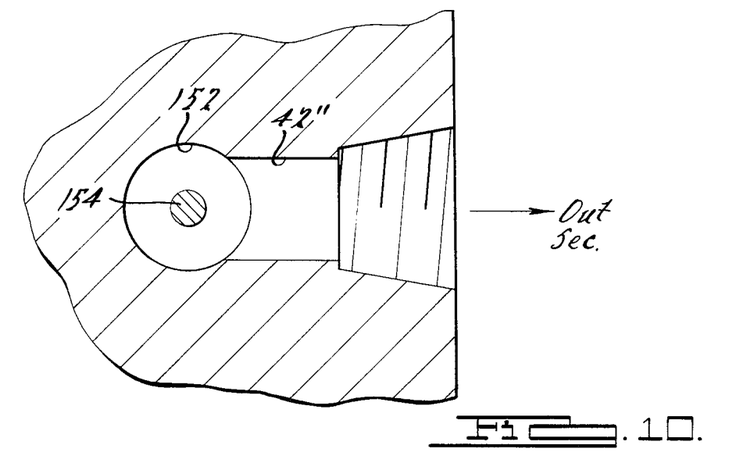
FIG. 10 is a cross-sectional view of the valve of FIG. 9 as seen from the plane of section line X—X of FIG. 10.

In FIG. 9 I have shown still another form of an orifice valve. It comprises a valve body 138 having a valve bore 140 which receives valve cylinder 142. Located in the cylinder 142 is a ball valve element 144 which is engaged by valve spring 146. Valve cylinder 142 is held in place by snap ring 148.

A flow inlet passage 12" supplies fluid from the power steering pump to the interior of the valve bore 140. Passage 12" corresponds to passage 12 in the FIG. 1 embodiment. Passage 12''' also communicates with the bore 140 thereby establishing a through passage from the pump 10 to the port 38 in the valve sleeve seen in FIG. 1.

Valve element 144 is adapted to register with valve land 150 defined by a valve cylinder 152 that is aligned with the ball 144 and the spring 146. A plunger 154 is positioned slidably in the valve bore 152. Passage 42'' communicates with the bore 152 on the left hand side of the plunger 154. The plunger 154 can be moved within the bore 152 by a variable force solenoid 156. The solenoid 156 is energized by a control module that is under the control of the vehicle speed sensor so that increasing vehicle speed causes an increase in the force of the solenoid when the vehicle speed increases the force opposing the spring 146 increases so that the effective area established by the valve element 144 and the valve land 150 increases.

The valve element 154 is pressurized on its right hand side by the pressure that exists in the passage 12'' since the pressure in that passage is distributed through a cross-over passage 158 to the right hand side of the plunger 154. Thus the plunger 154 is pressure balanced and floats in the bore 152.

Having described preferred embodiments of my invention, what I claim and desire to secure by U.S. Letters Patent is:

1. In a fluid pressure operated power steering gear mechanism having a fluid flow source, a pressure movable part adapted to be connected to a steering linkage for a vehicle, a drive member and a driving shaft connected to said drive member;

the connection between said drive member and said driving shaft comprising a torsion bar that accommodates angular displacement of said drive member relative to said driving shaft;

a rotary valve means situated in and partly defining pressure distribution and flow return passages extending to said pressure movable part and to said fluid flow source to effect pressure differential forces acting on said pressure movable part;

said valve means comprising an internal valve member and a surrounding sleeve;

said internal valve member having formed thereon two sets of valve lands, one set being axially displaced relative to the other, two sets of internal valve lands formed in said sleeve respectively registering with the valve land sets of said internal valve member;

said valve sleeve being connected operatively to said drive member for rotational movement therewith;

vehicle speed sensitive valve means for distributing fluid flow only to a first of said sets of valve lands at low vehicle speeds and for gradually increasing fluid flow to a second of said sets of said valve lands upon an increase in vehicle speed;

said internal valve member being connected to and rotatable with said driving shaft, the first set of said registering valve lands being adapted to control pressure distribution to said pressure movable part of said mechanism during initial deflection of said torsion bar and being adapted to progressively increase the magnitude of the pressure distributed to said pressure movable part as said torsion bar deflection increases within a first range of deflection during operation of low vehicle speeds and the other set of registering valve lands being adapted to control pressure distribution through said passages to said pressure movable part upon deflection of said torsion bar within a greater range of deflection of said torsion bar as fluid is distributed simultaneously to both valve lands sets at high vehicle speeds.

2. The combination as set forth in claim 1 wherein the first set of said registering valve lands comprises a primary valve means for effectively distributing steering pressure to said pressure movable part and increasing the magnitude of the pressure distributed to said pressure movable part upon an increase in the magnitude of the torque applied to said driving shaft and wherein the other set of registering valve lands comprises a secondary valve means for distributing pressure to said pressure movable part in parallel relationship with respect to the primary valve means thereby increasing the magnitude of the driving shaft torque required to reach a given steering pressure level when the fluid flow is distributed simultaneously to both valve land sets at high vehicle speeds.

3. The combination as set forth in claim 2 wherein said passages include said rotary valve means and separate passage portions for supplying flow to each of said sets of registering valve lands, said passages including a fluid flow valve means for suppling fluid from said fluid flow source to said second valve land set, and vehicle speed responsive means for actuating said fluid flow valve means to effect gradual increases in the flow to the second valve land set when the vehicle speed exceeds a predetermined value.

4. The combination as set forth in claim 3 wherein said fluid flow valve mans comprises a valve element that is adapted to prevent flow from said fluid flow source to one passage portion and a solenoid actuator comprising a solenoid armature adapted to engage said valve element when it is moved in one direction thereby permitting flow to occur from said fluid flow source to both passage portions, and solenoid windings for effecting shifting movement of said armature in one direction or the other as the windings become energized and de-energized.

5. The combination as set forth in claim 1 wherein said passages include said rotary valve means and separate passage portions for supplying flow to each of said sets of registering valve lands, said passages including a fluid flow valve means for supplying fluid from said fluid flow source to said second valve land set, and vehicle speed responsive means for actuating said fluid flow valve means to effect gradual increases in the flow to the second valve land set when the vehicle speed exceeds a predetermined value.

6. The combination as set forth in claim 5 wherein said fluid flow valve means comprises a valve element that is adapted to prevent flow from said fluid flow source to one passage portion and a solenoid actuator comprising a solenoid armature adapted to engage said valve element when it is moved in one direction thereby permitting flow to occur from said fluid flow source to both passage portions, and solenoid windings for effecting shifting movement of said armature in one direction or the other as the windings become energized and de-energized.

7. In a fluid pressure operated power steering gear mechanism having a fluid flow source, a pressure movable part adapted to be connected to a steering linkage for a vehicle, a drive member connected to said pressure movable part, a driving shaft connected to said drive member;

the connection between said drive member and said driving shaft comprising a torsion member that accommodates angular displacement of said drive member relative to said driving shaft;

a valve means situated in and partly defining pressure distribution and flow return passages extending to said pressure movable part and to said fluid flow source to effect pressure differential forces acting on said pressure movable part;

said valve means comprising an internal valve member and a surrounding sleeve;

said internal valve member having formed thereon two sets of valve lands, two sets of internal valve lands formed in said sleeve respectively registering with the valve land sets of said internal valve member;

said valve sleeve being connected operatively to said drive member for movement therewith;

vehicle speed sensitive valve means for distributing fluid flow only to a first pair of said registering valve lands at low vehicle speeds and for gradually increasing the distribution of fluid flow to both pairs of said registering valve lands upon an increase in vehicle speed;

said internal valve member being connected to and rotatable with said driving shaft, the first set of said registering valve lands being adapted to control pressure distribution to said pressure movable part during initial deflection of said torsion member and being adapted to effectively increase the magntide of the pressure distributed to said pressure movable part as the torsion member deflection increases within a first range of deflection during operation at low vehicle speeds and the other set of registering valve lands being adapted to control pressure distribution through said passages to said pressure movable part upon deflection of said torsion member within a greater range of deflection of said torsion member as fluid is distributed simultaneously to both valve lands sets upon an increase in vehicle speed.

8. The combination as set forth in claim 7 wherein the first set of said registering valve lands comprises a primary valve means for effectively distributing steering pressure to said pressure movable part and increasing the magnitude of the pressure distributed to said pressure movable part upon an increase in the magnitude of the torque applied to said driving shaft and wherein the other set of registering valve lands comprises a secondary valve means for distributing pressure to said pressure movable part in parallel relationship with respect to the primary valve means thereby increasing the magnitude of the driving shaft torque required to reach a given steering pressure level when the fluid flow is distributed simultaneously to both valve land sets at high vehicle speeds.

9. The combination as set forth in claim 8 wherein said passages include said valve means and separate passage portions for supplying flow to each of said sets of registering valve lands, said passages including a fluid flow valve means for supplying fluid from said fluid flow source to said second valve land set, and vehicle speed responsive means for actuating said fluid flow valve means to effect flow to both valve land sets upon an increase in vehicle speed.

10. The combination as set forth in claim 9 wherein said fluid flow valve means comprises a valve element that is adapted to prevent flow from said fluid flow source to one passage portion and a solenoid actuator comprising a solenoid armature adapted to engage said valve element when it is moved in one direction thereby permitting flow to occur from said fluid flow source to both passage portions, and solenoid windings for effecting shifting movement of said armature in one direction or the other as the windings become energized and de-energized.

11. The combination as set forth in claim 7 wherein said passages include said valve means and separate passage portions for supplying flow to each of said sets of registering valve lands, said passages including a fluid flow valve means for supplying fluid from said fluid flow source to said second valve land set, and vehicle speed responsive means for actuating said fluid flow valve means to effect flow to both valve land sets upon an increase in vehicle speed.

12. The combination as set forth in claim 11 wherein said fluid flow valve means comprises a valve element that is adapted to prevent flow from said fluid flow source to one passage portion and a solenoid actuator comprising a solenoid armature adapted to engage said valve element when it is moved in one direction thereby permitting flow to occur from said fluid flow source to both passage portions, and solenoid windings for effecting shifting movement of said armature in one direction or the other as the windings become energized and de-energized.

13. In a fluid pressure operated power steering gear mechanism having a fluid flow source, a pressure movable part adapted to be connected to a steering linkage for a vehicle, a drive member connected to said pressure movable part, a driving shaft connected to said drive member;
   the connection between said drive member and said driving shaft comprising a torsion member that accommodates angular displacement of said drive member relative to said driving shaft;
   a valve means situated in and partly defining pressure distribution and exhaust passages extending to said pressure movable part and to said fluid flow source to effect pressure differential forces acting on said pressure movable part;
   said valve means comprising an internal valve member and a surrounding sleeve;
   said internal valve member and said sleeve having registering valve lands that define a valve fluid flow metering area;
   said valve sleeve being connected operatively to said drive member for movement therewith;
   vehicle speed sensitive valve means for gradually changing the effective fluid flow area of said registering valve lands whereby the flow metering area at high speeds is greater than the flow metering area at low speeds and the flow metering area gradually increases upon an increase in vehicle speed;
   said internal valve member being connected to and rotatable with said driving shaft, said registering valve lands being relatively displaced to change the flow metering area defined thereby in proportion to the torque applied to said torsion member and adapted to effectively increase the magnitude of the pressure distributed to said pressure movable part as said torsion member deflection increases within a first range of deflection during operation at low vehicle speeds and to effectively increase the magnitude of the pressure distributed to said pressure movable part as said torsion member deflection increases within a second range of deflection during operation at high vehicle speeds whereby for any given steering pressure the second range of deflection is greater than the first range.

14. In a fluid pressure operated power steering gear mechanism having a fluid flow source, a pressure movable part adapted to be connected to a steering linkage for a vehicle, a drive member connected to said pressure movable part, a driving shaft connected to said drive member;
   the connection between said drive member and said driving shaft comprising a torsion member that accommodates angular displacement of said drive member relative to said driving shaft;
   a valve means situated in and partly defining pressure distribution and exhaust passages extending to said pressure movable part and to said fluid flow source to effect pressure differential forces acting on said pressure movable part;
   said valve means comprising an internal valve member and a surrounding sleeve valve member, said valve members having registering valve lands that define a valve fluid flow metering area;
   one valve member being connected operatively to said drive member for movement therewith; the other valve member being connected operatively to said driving shaft;
   vehicle speed sensitive valve means for gradually changing the effective fluid flow metering area of said registering valve lands whereby the flow metering area at high speeds is greater than the flow metering area at low speeds and the flow metering area gradually increases upon an increase in vehicle speed;
   said registering valve lands being relatively displaced to change the flow metering area defined thereby in proportion to the torque applied to said torsion member and adapted to effectively increase the magnitude of the pressure distributed to said pressure movable art as said torsion member deflection increases within a first range of deflection during operation at low vehicle speeds and to effectively increase the magnitude of the pressure distributed to said pressure movable part as said torsion member deflection increases within a second range of deflection during operation at high vehicle speeds whereby for any given steering pressure the second range of deflection is greater than the first range.

15. In a fluid pressure operated power steering gear mechanism having a fluid flow source, a pressure movable part adapted to be connected to a steering linkage for a vehicle, a drive member connected to said pressure movable part, a driving shaft connected to said drive member;
- a steering valve means situated in and partly defining pressure distribution and flow return passages extending to said pressure movable part and to said fluid flow source to effect pressure differential forces acting on said pressure movable part;
- said valve means comprising an internal valve member and a surrounding valve sleeve member;
- the connection between said drive member and said driving shaft comprising a valve member centering spring that accommodates angular displacement of said drive member relative to said driving shaft;
- said internal valve member having formed thereon two sets of valve lands, two sets of internal valve lands formed in said sleeve member respectively registering with the valve land sets of said internal valve member;
- said valve sleeve member being connected drivably to said drive member;
- vehicle speed sensitive valve means for distributing fluid flow only to a first pair of said registering valve lands at low vehicle speeds and for gradually increasing the fluid flow to both pair of said registering valve lands upon an increase in vehicle speed;
- said internal valve member being connected to and rotatable with said driving shaft, the first pair of registering valve lands being adapted to control pressure distribution to said pressure movable part during initial deflection of said centering spring and being adapted to increase the magnitude of the pressure distributed to said pressure movable part as the centering spring deflection increases within a first range of deflection during operation at low vehicle speeds and the other pair of registering valve lands being adapted to control pressure distribution through said passages to said pressure movable part upon deflection of said centering spring as fluid is distributed simultaneously to both valve land pairs at high vehicle speeds.

16. In a fluid pressure operated power steering gear mechanism having a fluid flow source, a pressure movable part adapted to be connected to a steering linkage for a vehicle, a drive member connected to said pressure movable part, a driving shaft connected to said drive member;
- a steering valve means situated in and partly defining pressure distribution and flow return passages extending to said pressure movable part and to said fluid flow source to effect pressure differential forces acting on said pressure movable part;
- said valve means comprising an internal valve member and a surrounding valve sleeve member;
- the connection between said drive member and said driving shaft comprising a valve member centering spring that accommodates angular displacement of said drive member relative to said driving shaft;
- said internal valve member having formed thereon two sets of valve lands, two sets of internal valve lands formed in said sleeve member respectively registering with the valve land sets of said internal valve member;
- one of said valve members being connected drivably to said drive member;
- vehicle speed sensitive valve means for distributing fluid flow only to a first pair of said registering valve lands at low vehicle speeds and gradually increasing fluid flow to both pairs of said registering valve lands upon an increase in vehicle speed;
- the other of said valve members being connected drivably to and actuated by said driving shaft, the first pair of registering valve lands being adapted to control pressure distribution to said pressure movable part during initial deflection of said centering spring and being adapted to increase the magnitude of the pressure distributed to said pressure movable part as the centering spring deflection increases within a first range of deflection during operation at low vehicle speeds and the other pair of registering valve lands being adapted to control pressure distribution through said passages to said pressure movable part upon deflection of said centering spring within a greater range of deflection of said centering spring as fluid is distributed simultaneously to both valve land pairs at high vehicle speeds.

17. In a fluid pressure operated power steering gear mechanism having a fluid flow source, a pressure movable part adapted to be connected to a steering linkage for a vehicle, a drive member connected to said pressure movable part, a driving shaft connected to said drive member;
- a steering valve means situated in and partly defining a flow throttling fluid flow area that forms a part of pressure distribution and flow return passages extending to said pressure movable part and to said fluid flow source to effect pressure differential forces acting on said pressure movable part;
- said valve means comprising an internal valve member and a surrounding valve sleeve member;
- the connection between said drive member and said driving shaft comprising a valve member centering spring that accommodates angular displacement of said drive member relative to said driving shaft;
- said internal valve member having valve lands formed thereon, two sets of internal valve lands formed in said sleeve respectively registering with the valve lands of said internal valve member;
- one of said valve members being connected drivably to said drive member;
- vehicle speed sensitive valve means for gradually increasing the effective fluid flow throttling area for said steering valve means as the vehicle speed increases;
- the other of said valve members being connected drivably to and actuated by said driving shaft, the registering valve lands being adapted to control pressure distribution to said pressure movable part during initial deflection of said centering spring and being adapted to increase the magnitude of the pressure distributed to said pressure movable part as the centering spring deflection increases within a first range of deflection during operation at low vehicle speeds and the other pair of registering valve lands being adapted to control pressure distribution through said passages to said pressure movable part upon deflection of said centering spring within a greater range of deflection of said centering spring as fluid is distributed through an increased valve throttling area at high vehicle speeds.

* * * * *